United States Patent
Kumar et al.

(10) Patent No.: US 7,324,229 B2
(45) Date of Patent: Jan. 29, 2008

(54) RENDERING IN A PRINTER USING BANDS

(75) Inventors: Santhosh Trichur Natrajan Kumar, Trichur (IN); Shajil Asokan Thaniyath, Trichur (IN)

(73) Assignee: Texas Instruments Incorporated, Dallas, TX (US)

( * ) Notice: Subject to any disclaimer, the term of this patent is extended or adjusted under 35 U.S.C. 154(b) by 796 days.

(21) Appl. No.: 10/119,050

(22) Filed: Apr. 10, 2002

(65) Prior Publication Data

US 2003/0198092 A1    Oct. 23, 2003

(51) Int. Cl.
*G06F 15/00* (2006.01)
*G06K 1/00* (2006.01)

(52) U.S. Cl. .............. 358/1.15; 358/1.16; 358/1.9; 715/501.1; 345/501

(58) Field of Classification Search ............. 358/1.15, 358/1.16, 1.18, 1, 1.9; 709/226; 345/501; 382/103; 715/501.1
See application file for complete search history.

(56) References Cited

U.S. PATENT DOCUMENTS

| | | | | |
|---|---|---|---|---|
| 5,544,290 A | * | 8/1996 | Gentile | 358/1.16 |
| 5,611,024 A | * | 3/1997 | Campbell et al. | 358/1.15 |
| 5,805,174 A | * | 9/1998 | Ramchandran | 345/501 |
| 5,870,535 A | * | 2/1999 | Duffin et al. | 358/1.16 |
| 6,038,033 A | * | 3/2000 | Bender et al. | 358/1.16 |
| RE37,272 E | * | 7/2001 | Ochi et al. | 358/1.15 |
| 6,321,266 B1 | * | 11/2001 | Yokomizo et al. | 709/226 |
| 6,449,058 B1 | * | 9/2002 | Ueda | 358/1.16 |
| 6,538,766 B1 | * | 3/2003 | Henry et al. | 358/1.16 |
| 6,795,208 B1 | * | 9/2004 | Tanaka | 358/1.16 |
| 6,819,447 B1 | * | 11/2004 | Sawano | 358/1.16 |
| 6,829,372 B2 | * | 12/2004 | Fujioka | 382/103 |
| 6,847,467 B2 | * | 1/2005 | Obrador | 358/1.16 |
| RE38,732 E | * | 5/2005 | Wood et al. | 358/1.15 |
| 6,947,166 B2 | * | 9/2005 | Ueda | 358/1.16 |
| 6,956,667 B2 | * | 10/2005 | Delhoune et al. | 358/1.18 |
| 7,019,864 B2 | * | 3/2006 | Delhoune et al. | 358/1.18 |
| 7,103,833 B1 | * | 9/2006 | Sano et al. | 715/501.1 |
| 2004/0246510 A1 | * | 12/2004 | Jacobsen et al. | 358/1.9 |

\* cited by examiner

*Primary Examiner*—Douglas Q. Tran
*Assistant Examiner*—Satwant Singh
(74) *Attorney, Agent, or Firm*—Robert D. Marshall, Jr.; W. James Brady; Frederick J. Telecky, Jr.

(57) ABSTRACT

A page may be divided into several blocks which do not span the entire width of a page. A bit map representing the page content may be generated by rendering the display lists representing the blocks. According to another aspect, a display list may be generated associated with a big portion of a page. The big portion may be divided into smaller portions at/before rendering, and bit maps may be generated for the smaller portions.

12 Claims, 2 Drawing Sheets

RENDERING IN A PRINTER USING BANDS

BACKGROUND OF THE INVENTION

1. Field of the Invention

The present invention relates to printers, and more specifically to a method and apparatus for rendering in a printer using bands.

2. Related Art

Printers are often used to print a specified content (received from an external system such as personal computers) on medium such as paper. The content to be printed (for example, a page) is typically specified by page description languages (PDL) such as Postscript (PS) and printer control language (PCL), as is well known in the relevant arts. Printing generally entails converting a page content specified by a PDL to a corresponding bit map. The bit map may then be used to print the content on the desired medium.

A page is often divided into bands. A band generally refers to a rectangular section spanning the entire width of the page. A bit map is generally generated for each band, and the page content for the band is printed using the bit map. All the bands of a page may thus be printed to generate the corresponding page.

To facilitate the generation of a bit map for a band with minimal memory, printers often divide a band into sub-bands. A display list (containing lower level primitives such as trapezoids and lines) is typically generated associated with each sub-band. A bit map for the sub-hand is generated using the display list. The generation of such a bit map is often referred to as rendering. A bit map for the entire band would be generated by rendering all the contained sub-bands.

In general, the approaches generating a page content need to be implemented while potentially meeting several requirements (e.g., memory requirement, throughput performance, etc.). What is therefore needed is a method and apparatus which enables rendering while meeting one or more of such requirements.

SUMMARY OF THE INVENTION

According to an aspect of the present invention, a printer controller may divide a page into multiple blocks which do not span the entire width of a page. Display lists are generated covering the blocks, and a rendering module renders the display list to generate a page content for printing on the page. Due to the use of blocks which do not span the entire page width, potential advantages such as minimization of processing and/or memory requirements may be realized.

According to another aspect of the present invention, an interpreter in a printer controller divides a page into several big portions, and a display list is generated associated with each big portion according to PDL statements defining a page content. Each display list may be rendered multiple times to generate a corresponding number of smaller portions. As a result, the number of list elements may be minimized and the memory requirements may also be correspondingly reduced.

In an implementation, coordinates representing the division of each bit portion into smaller portion, may be stored. A rendering module may perform clipping using the coordinates to render only the portions representing the smaller portion. In one embodiment, each smaller block corresponds to a block which does not span the entire width of a page.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention enables a page to be divided into several blocks which do not span the entire width of a page. A bit map representing the page content may be generated by rendering the display lists representing the blocks. Due to the feature that the page need not span the entire page width, several advantages may be potentially realized as described below with reference to example environments.

Another aspect of the present invention enables a display list to be generated associated with a big portion of a page. However, the big portion may be divided into smaller portions at/before rendering, and bit maps may be generated for the smaller portions. By storing display lists only for the big portions, the memory requirements for storing the display lists may be reduced.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Printer

Figure 1:
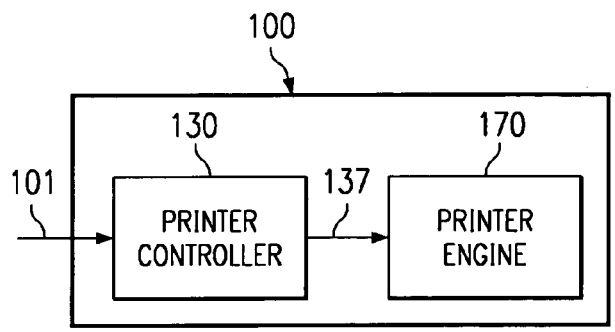
FIG. 1 is a block diagram illustrating the details of an example printer.

FIG. 1 is a block diagram illustrating the details of an embodiment of printer 100 in accordance with the present invention. Printer 100 is shown containing printer controller 130 and printer engine 170. Each component is described in further detail below.

Printer engine 170 receives on path 137 a bitmap (representing the page content to be printed) suitable in format for printing, and prints the bit map on medium such as paper.

Printer engine 170 can be implemented in a known way. In an embodiment, printer engine 170 is implemented using laser technology.

Printer controller 130 may receive statements (defining a page content to be printed) on path 101, and generates a bitmap representing the page content. The statements may be received from an external computer system (not shown), and be specified in a page description language (PDL) such as Printer Control Language (PCL) or PostScript, well known in the relevant arts.

In an embodiment, printer controller 130 may divide a page into blocks that do not span the entire width of the page. A bit map may be generated for each block and the generated bit maps may be provided to printer engine 170 on path 137. The manner in which the page can be divided and subsequently rendered is described below.

3. Method

Figure 2A:
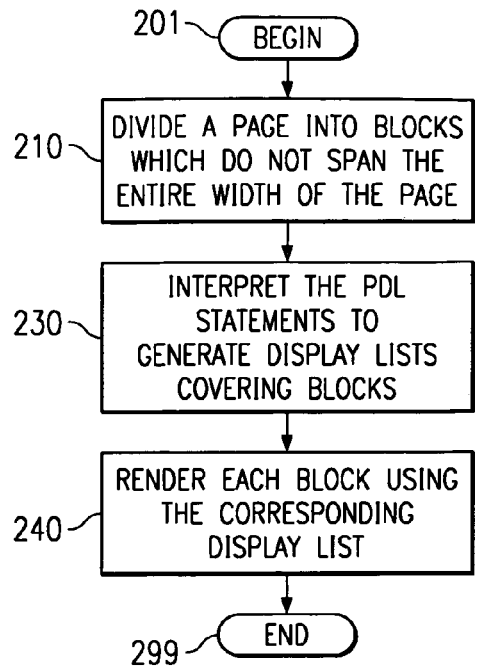
FIG. 2A is a flow chart illustrating the manner in which a page may be divided.

FIG. 2A is a flow chart illustrating the manner in which a page maybe rendered, according to an aspect of the present invention. The method is described with reference to FIG. 1 for illustration. However, the method can be implemented in other printers as well. The method begins in step 201, in which control immediately passes to step 210.

In step 210, a page (received in PDL format) may be divided into blocks which do not span the entire width of the page. In an embodiment described below, the blocks are rectangular in shape.

In step 230, display lists may be generated covering the blocks of the page. The generated display lists may be stored in a memory. In step 240, the bit map for each block may be generated using the corresponding display list. The bit maps together define the content of a page to be printed. Once generated, the bit maps may be sent to printer engine 170 for printing. The flow chart ends at end block 299.

Thus, a page generated in accordance with the present invention can be printed in a printer. As noted above, the page is divided into blocks which do not span the entire page. The manner in which a page may divided into several blocks is described in further detail with reference to FIG. 2B.

4. Example Page

Figure 2B:
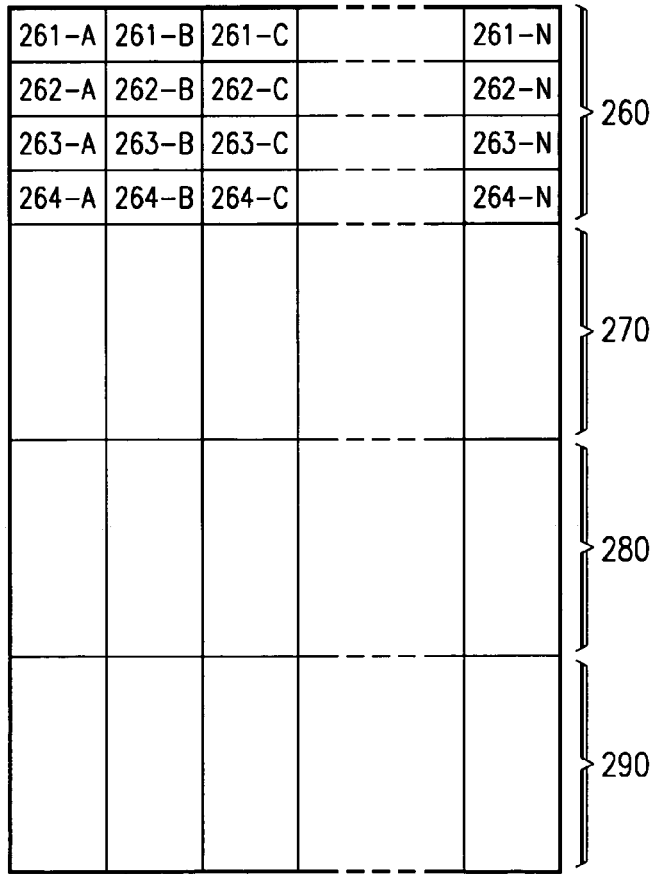
FIG. 2B is a block diagram illustrating the details of an example page divided according to an aspect of the present invention.

FIG. 2B is a diagram of page 250 illustrating the manner in which a page can be divided in an embodiment of the present invention. Page 250 is shown containing bands 260, 270, 280 and 290. Bands 260, 270, 280 and 290 refer to the rectangular blocks that span the entire width of page 250. The bitmap corresponding to a band may be stored in a band buffer before providing to printer controller 170 as is well known in the relevant Band 260 is shown containing sub-parts 261-A through 261-N, 262-A through 262-N, 263-A through 263-N and 264-A through 264-N. As may be readily observed, the sub-parts do not span the entire width of page 250.

It may be appreciated that using rectangular blocks (not spanning entire page width) can offer several advantages. For example, assuming only a fixed (or small) amount of memory space is available for each sub-part; more lines of a block may be stored in the vertical direction, and as objects (in the page content) are upsealed in the vertical direction often, more lines of data can be generated when processing a single rectangular block. Another potential advantage is that the memory required to store display lists may be shorter as the objects are more likely to be within a few of the blocks.

One problem with the above approach is that a large number of display lists may be generated with potentially the same display list elements (DLEs) getting replicated in many display lists. This happens because the DLEs often spans across multiple sub-bands as the area of the sub-bands tends to be relatively small. All the generated display lists may be required to be stored in memory. Accordingly, a method to minimize memory requirements while storing the display lists is described below.

5. Minimizing Memory Requirements

Figure 3:
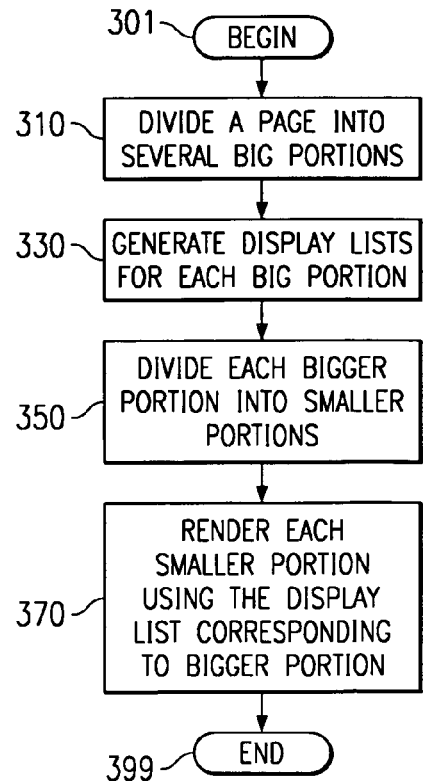
FIG. 3 is a flow chart illustrating the manner in which display lists are generated and rendered according to an aspect of the present invention.

FIG. 3 is a flow chart illustrating the manner in which display lists may be generated according to an aspect of the present invention. The method is described with reference to FIG. 2B for illustration. The method begins in step 301, in which control immediately passes to step 310.

In step 310, page 250 is divided into several big portions. In step 330, a display list may be generated for each big portion of page 250. The display list thus generated may be stored in a memory. Due to the division into big portions, the number of display lists may be minimized, and memory requirements may also be correspondingly reduced.

In step 350, each big portion may be viewed as being divided into several smaller portions. In step 370, a bit map corresponding to each smaller portion may be generated by rendering the display list containing the smaller portion. Thus, a single display list may be used to render several sub-parts.

Thus, a fewer number of display lists may be sufficient to render all sub-parts of page 250. As a result, fewer display lists need to be stored, thereby potentially reducing memory requirements. The approach of FIG. 3 may be combined with the approach of FIG. 2A as described below. The flow chart ends at end block 399.

6. Combining the Approaches of FIG. 3 and FIG. 2A

In an embodiment, each smaller portion equals a sub-part of FIG. 2B. Accordingly, a big portion (of FIG. 3) contains several sub-parts. A big portion, thus formed, may be referred to as a logical part. For example, in FIG. 2B, subparts 261-A, 261-B, 262-A and 262-B may together represent a logical part.

In operation, printer controller 130 may generate a display list for each logical part. The display list may then be rendered multiple times to generate the bit map related to each sub-part. However, it should be appreciated that embodiments may be implemented which implement only one of the two Figures without implementing the features of the other. An embodiment of printer controller 130 which implements such a combined approach of FIGS. 2A and 3 is described below in further detail.

7. Printer Controller

Figure 4:
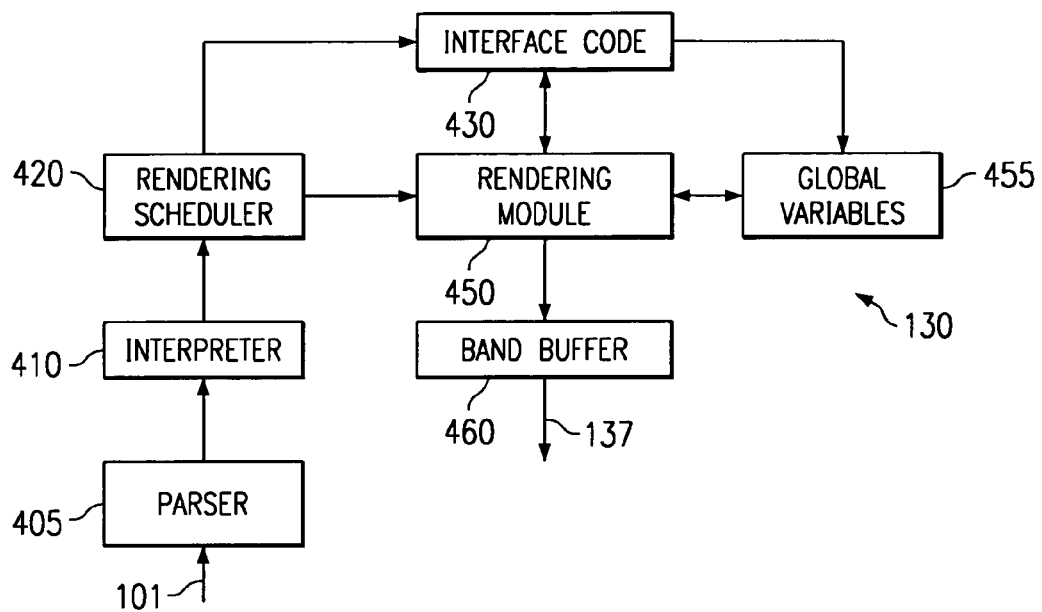
FIG. 4 is a block diagram illustrating the details of an embodiment of a printer controller.

FIG. 4 is a block diagram illustrating the details of an embodiment of printer controller 130 implemented in accordance with the present invention. Printer controller 130 is shown containing parser 405, interpreter 410, rendering scheduler 420, interface code 430, rendering module 450, global variables block 455, and band buffer 460. Each component is described in further detail below.

Parser 405 ensures that the statements (describing a page content) received on path 101 are consistent with a page description language (PDL), and passes the received statements to interpreter 410. Parser 405 may be implemented in a known way.

Interpreter 410 converts the statements received in PDL format to a corresponding display list. In an embodiment, interpreter 410 generates a display list for each logical part described in the earlier sections. For example, with reference to FIG. 2B, a single display list is generated for a logical part containing sub-parts 261-A, 261-B, 262-A and 262-B. In other words, interpreter 410 may generate display lists corresponding to big portions, thus decreasing the number of display lists generated for a page. As a result, the memory requirements to store the display lists may be substantially reduced.

Rendering scheduler 420 schedules each logical part for subsequent processing (rendering). One of several well known approaches may be used to implement rendering scheduler 420.

Interface code 430 provides the interface between rendering scheduler 420 and source rendering module 450. In general, interface code 430 interfaces with rendering scheduler 420, and performs various initializations required for rendering modules. In addition, interface code 430 indicates the relative coordinates which can be used to divide each big portion (logical part) into multiple cells. In the scenario of FIG. 2B, the coordinates of the two corner points of each rectangle may be used for the division. The coordinates may be stored in global variable 455.

Global variables 455 represents various values used for rendering (and other operations) which generates bit maps representing page 250. Examples of the variables stored may include start and end of line numbers for the sub-parts, the co-ordinates of the display lists corresponding to each logical part, the respective co-ordinates of the display list that is required to be clipped for corresponding sub-parts, etc.

Rendering module 450 generates a bitmap for each sub-part of page 250 based on the display list provided for each logical part. In general, rendering needs to be performed to support the specific PDL (e.g., PostScript, Page Description Language) and the interpretation approach used. Rendering is generally described in a book entitled, "PostScript Language Reference Manual—2nd Edition—Red Book", available from Adobe Systems Incorporated, which is incorporated in its entirety herewith.

In addition, rendering module 450 may need to be implemented to generate bit maps for the individual sub-parts using the display lists generated for the logical parts. In an embodiment, the coordinates of each sub-part may be used to clip the portions of the image not related to a sub-part being rendered. In other words, assuming a display list is related to a logical part containing sub-parts 261-A, 261-B, 262-A and 262-B, when a bit map is generated for sub-part 261-B, the image portions related to the remaining three sub-parts may be clipped using the coordinates of sub-part 261-A.

The clipping can be implemented using one of several known techniques. Such a clipping may be needed in addition to any other clipping required for generating the page content representing the individual cell. In general, the clipping operations can be combined to reduce the computation requirements. The rendered sub-part (or corresponding bit maps) may be stored in band buffer 460. The bit maps may then be sent on path 137 for printing.

Thus, using the approaches described above, several embodiments of printer 100 may be implemented. The embodiments may be implemented in a combination of software, hardware and firmware. The description is continued with reference to the manner in which printer controller 130 may be implemented substantially in software.

8. Software Implementation

Figure 5:
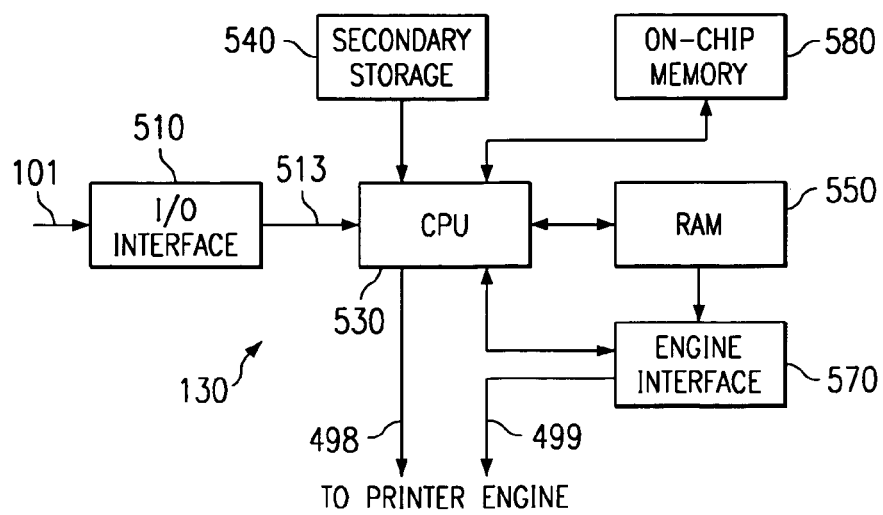
FIG. 5 is a block diagram illustrating the details of an embodiment of a printer controller implemented substantially in hardware.

FIG. 5 is a block diagram illustrating the details of printer controller 130 implemented substantially in software according to an aspect of the present invention. Printer controller 130 is shown containing input/output (I/O) interface 510, central processing unit (CPU) 530, on-chip memory 540, random access memory (RAM) 550 and engine interface 570. Each component is described below in further detail.

Input/output interface 510 provides the interface with an external system such as personal computer. I/O interface 510 receives statements on path 101 requesting to print a page content specified in a page description language (PDL) such as Printer Control Language (PCL) or PostScript. I/O interface 510 forwards the statements to CPU 530 on line 513.

Engine interface 570 provides an interface between printer controller 130 and printer engine 170. Lines 498 and 499 together represent line 137 illustrated in FIG. 1. Engine interface 570 may be implemented in a known way.

On-chip memory 580 generally allows faster accesses in storing and retrieving data, and may be used to store the data requiring fast accesses. In an embodiment, on-chip memory 580 is used to store the rendered bit maps. By storing rendered bit maps in on-chip memory 580, the storing task may not be a bottleneck while CPU 530 renders a bit map. Such a feature may be particularly important as the processing speeds of CPU 530 may improve substantially over time. The bit maps are then transferred to RAM 550 (which is used to provide band buffer 460).

RAM 550 may be used to store the instructions prior to execution (by Cpu 530). In addition, RAM 550 may be used to implement temporary buffer and band buffer 460. Secondary memory 540 may contain units such as hard drive (not shown), removable storage (e.g., flash memory, also not shown). Secondary storage 540 may store software instructions and data (for example, the global parameters), which enable Cpu 530 to provide several features in accordance with the present invention. The software instructions may be provided to CPU 530 from other sources such as over a network implemented using protocols such as TCP/IP.

CPU 530 executes the instructions provided from secondary memory to process the print statements and generate bit maps representing sub-parts (forming page 250), as described in the previous sections. The instructions may also cause the bitmap to be provided to printer engine 170 on path 498.

Thus, the present invention may be implemented using software running (that is, executing) in printer controller 130. In this document, the term "computer program product" is used to generally refer to removable storage unit or hard disk installed in hard drive. These computer program products are means for providing software to printer 100. These computer program products generally contain computer readable medium providing software to printer controller 130. The computer readable medium can be provided external to printer controller 130.

The approaches of above may lead to several advantages. For example, systems with memory constraints may save data (e.g., rendered bit maps or display lists) in compressed format. By minimizing the memory requirements, systems may not need to expend the processing power to compress and decompress the data. In addition, as 'lossy' compression techniques may not need to be used, the quality of the generated images may be high.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of generating a page content to be printed on a page, said method comprising:
   receiving a plurality of statements representing said page content;
   dividing said page into a plurality of big portions and a plurality of smaller portions, each big portion having a plurality of smaller portions contained therein, each smaller portion corresponding to a sub-part which does not span an entire width of said page and each big portion is completely filled with said plurality of small portions;
   interpreting said plurality of statements to generate a display list for each of said plurality of big portions of said page according to said plurality of statements; and
   rendering said display list corresponding to each of said plurality of big portions a plurality of times to generate bit maps representing each of said contained plurality of smaller portions of said page content.

2. The method of claim 1, wherein said sub-part corresponds to a rectangle.

3. The method of claim 1, further comprising storing a plurality of coordinates indicating the division of said big portion into said plurality of smaller portions, wherein said rendering comprises applying clipping using said plurality of coordinates and said big portion to generate said bit maps representing said plurality of smaller portions.

4. A printer for generating a page content to be printed on a page, said printer comprising:
   a printer controller receiving a plurality of statements representing said page content, dividing said page into a plurality of big portions and a plurality of smaller portions, each big portion having a plurality of smaller portions contained therein, each smaller portion corresponding to a sub-part which does not span an entire width of said page and each big portion is completely filled with said plurality of small portions, and interpreting said plurality of statements to generate a display list for each of said plurality of big portions of said page according to said plurality of statements,
   said printer controller rendering said display list corresponding to each of said plurality of big portions a plurality of times to generate bit maps representing each of said contained plurality of smaller portions of said page content; and
   a printer engine receiving said bit maps and printing on said page according to said bit maps.

5. The printer of claim 4, wherein said sub-part corresponds to a rectangle.

6. The printer of claim 4, wherein said printer controller stores a plurality of coordinates indicating the division of said big portion into said plurality of smaller portions, wherein said printer controller performs clipping using said plurality of coordinates and said big portion to generate said bit maps representing said plurality of smaller portions.

7. A printer controller for generating a page content to be printed on a page, said printer controller comprising:
   means for receiving a plurality of statements representing said page content;
   means for dividing said page into a plurality of big portions and a plurality of smaller portions, each big portion having a plurality of smaller portions contained therein, each smaller portion corresponding to a sub-part which does not span an entire width of said page and each big portion is completely filled with said plurality of small portions;
   means for interpreting said plurality of statements to generate a display list for each of said plurality of big portions of said page according to said plurality of statements; and
   means for rendering said display list corresponding to each of said plurality of big portions a plurality of times to generate bit maps representing each of said contained plurality of smaller portions of said page content.

8. The printer controller of claim 7, wherein said sub-part corresponds to a rectangle.

9. The printer controller of claim 7, further comprising means for storing a plurality of coordinates indicating the division of said big portion into said plurality of smaller portions, wherein said means for rendering performs clipping using said plurality of coordinates and said big portion to generate said bit maps representing said plurality of smaller portions.

10. A computer readable medium encoded with one or more sequences of instructions for causing a printer to generate a page content suitable for printing on a page, wherein execution of said one or more sequences of instructions by one or more processors contained in said printer causes said one or more processors to perform the actions of:
    receiving a plurality of statements representing said page content;
    dividing said page into a plurality of big portions and a plurality of smaller portions, each big portion having a plurality of smaller portions contained therein, each smaller portion corresponding to a sub-part which does not span an entire width of said page and each big portion is completely filled with said plurality of small portions;
    interpreting said plurality of statements to generate a display list for each of said plurality of big portions of said page according to said plurality of statements; and
    rendering said display list corresponding to each of said plurality of big portions a plurality of times to generate bit maps representing each of said contained plurality of smaller portions of said page content.

11. The computer readable medium of claim 10, wherein said sub-part corresponds to a rectangle.

12. The computer readable medium of claim 10, further comprising storing a plurality of coordinates indicating the division of said big portion into said plurality of smaller portions, wherein said rendering comprises applying clipping using said plurality of coordinates and said big portion to generate said bit maps representing said plurality of smaller portions.

* * * * *